(12) United States Patent
Milheim

(10) Patent No.: US 11,121,614 B2
(45) Date of Patent: Sep. 14, 2021

(54) PRE-WARPED ROTORS FOR CONTROL OF MAGNET-STATOR GAP IN AXIAL FLUX MACHINES

(71) Applicant: E-Circuit Motors, Inc., Newton, MA (US)

(72) Inventor: George Harder Milheim, Bozeman, MT (US)

(73) Assignee: E-Circuit Motors, Inc., Newton, MA (US)

( * ) Notice: Subject to any disclaimer, the term of this patent is extended or adjusted under 35 U.S.C. 154(b) by 442 days.

(21) Appl. No.: 15/983,985

(22) Filed: May 18, 2018

(65) Prior Publication Data

US 2018/0351441 A1    Dec. 6, 2018

Related U.S. Application Data

(60) Provisional application No. 62/515,251, filed on Jun. 5, 2017, provisional application No. 62/515,256, filed on Jun. 5, 2017.

(51) Int. Cl.
*H02K 1/27* (2006.01)
*H02K 21/24* (2006.01)
(Continued)

(52) U.S. Cl.
CPC .......... *H02K 29/08* (2013.01); *H02K 1/2793* (2013.01); *H02K 3/26* (2013.01); *H02K 15/03* (2013.01);
(Continued)

(58) Field of Classification Search
CPC .... H02K 1/2793; H02K 21/026; H02K 21/24; H02K 37/125; H02K 2201/03
(Continued)

(56) References Cited

U.S. PATENT DOCUMENTS 2,970,238 A    1/1961    Swiggett
3,096,455 A    7/1963    Hahn
(Continued)

FOREIGN PATENT DOCUMENTS

CN    103001426 A    3/2013
CN    202856473 U    4/2013
(Continued)

OTHER PUBLICATIONS

DE-19954196-A1 (English Translation) (Year: 2000).*
(Continued)

*Primary Examiner* — Quyen P Leung
*Assistant Examiner* — Alexander Moraza
(74) *Attorney, Agent, or Firm* — Pierce Atwood LLP

(57) ABSTRACT

An assembly for use in an axial flux motor or generator includes a rotor plate and a magnet, the magnet having a surface that is orthogonal to a magnetization direction of the magnet. The rotor plate is adapted to engage a rotor shaft that rotates about an axis of rotation, and the magnet is attached to the rotor plate. The rotor plate and magnet are configured and arranged such that, if the rotor plate and the magnet are separated from all other magnetic field generating components, then a distance between a first plane that intercepts a first point on the surface and to which the axis of rotation is normal and a second plane that intercepts a second point on the surface and to which the axis of rotation is normal is substantially greater than zero.

26 Claims, 15 Drawing Sheets

(51) Int. Cl.
 *H02K 3/26* (2006.01)
 *H02K 29/08* (2006.01)
 *H02K 23/54* (2006.01)
 *H02K 15/03* (2006.01)

(52) U.S. Cl.
 CPC ............ *H02K 23/54* (2013.01); *H02K 21/24* (2013.01); *H02K 2201/03* (2013.01)

(58) Field of Classification Search
 USPC ........................................ 310/156.32–156.37
 See application file for complete search history.

(56) References Cited

U.S. PATENT DOCUMENTS

| | | | |
|---|---|---|---|
| 4,045,696 | A | 8/1977 | Lutz et al. |
| 4,115,915 | A | 9/1978 | Godfrey |
| 4,658,162 | A | 4/1987 | Koyama et al. |
| 4,677,332 | A | 6/1987 | Heyraud |
| 4,733,115 | A | 3/1988 | Barone et al. |
| 4,804,574 | A | 2/1989 | Osawa et al. |
| 5,099,162 | A | 3/1992 | Sawada |
| 5,126,613 | A | 6/1992 | Choi |
| 5,332,460 | A | 7/1994 | Hosoya |
| 5,644,183 | A | 7/1997 | Loenen et al. |
| 5,710,476 | A | 1/1998 | Ampela |
| 5,952,742 | A | 9/1999 | Stoiber et al. |
| 6,628,038 | B1 | 9/2003 | Shikayama et al. |
| 7,109,625 | B1* | 9/2006 | Jore .................. H02K 21/24 310/198 |
| 7,112,910 | B2 | 9/2006 | Lopatinsky et al. |
| 7,301,428 | B2 | 11/2007 | Suzuki et al. |
| 7,415,756 | B2 | 8/2008 | Ishida et al. |
| 7,523,540 | B2 | 4/2009 | Morel |
| 7,750,522 | B2 | 7/2010 | Gizaw et al. |
| 7,763,997 | B2 | 7/2010 | Dubuc et al. |
| 7,812,697 | B2 | 10/2010 | Fullerton et al. |
| 7,882,613 | B2 | 2/2011 | Barthelmie et al. |
| 8,058,762 | B2 | 11/2011 | Asano |
| 8,179,002 | B2 | 5/2012 | Mancuso et al. |
| 8,225,497 | B2 | 7/2012 | Johnson et al. |
| 8,339,019 | B1 | 12/2012 | Oyague |
| 8,362,731 | B2 | 1/2013 | Smith et al. |
| 8,397,369 | B2 | 3/2013 | Smith et al. |
| 8,400,038 | B2 | 3/2013 | Smith et al. |
| 8,558,425 | B2 | 10/2013 | Stahlhut et al. |
| 8,598,761 | B2 | 12/2013 | Langford et al. |
| 8,692,637 | B2 | 4/2014 | Richards et al. |
| 8,716,913 | B2 | 5/2014 | Kvam et al. |
| 8,723,052 | B1 | 5/2014 | Sullivan et al. |
| 8,723,402 | B2 | 5/2014 | Oyague |
| 8,736,133 | B1 | 5/2014 | Smith et al. |
| 8,785,784 | B1 | 7/2014 | Duford et al. |
| 8,816,543 | B2 | 8/2014 | Kozar et al. |
| 8,823,241 | B2 | 9/2014 | Jore et al. |
| 8,941,961 | B2 | 1/2015 | Banerjee et al. |
| 9,013,257 | B2 | 4/2015 | Steingroever |
| 9,154,024 | B2 | 10/2015 | Jore et al. |
| 9,269,483 | B2 | 2/2016 | Smith et al. |
| 9,479,038 | B2 | 10/2016 | Smith et al. |
| 9,673,684 | B2 | 6/2017 | Shaw |
| 2002/0145360 | A1* | 10/2002 | Pullen .................. H02K 21/026 310/268 |
| 2005/0067905 | A1 | 3/2005 | Maney et al. |
| 2005/0194855 | A1 | 9/2005 | Hasbe et al. |
| 2006/0055265 | A1 | 3/2006 | Zalusky |
| 2006/0202584 | A1 | 9/2006 | Jore et al. |
| 2008/0067874 | A1 | 3/2008 | Tseng |
| 2008/0100166 | A1 | 5/2008 | Stahlhut et al. |
| 2009/0021333 | A1 | 1/2009 | Fiedler |
| 2009/0072651 | A1 | 3/2009 | Fan et al. |
| 2010/0000112 | A1 | 1/2010 | Carow et al. |
| 2010/0123372 | A1 | 5/2010 | Huang et al. |
| 2011/0024146 | A1 | 2/2011 | Katou et al. |
| 2011/0241460 | A1 | 10/2011 | Mebarki et al. |
| 2011/0241470 | A1* | 10/2011 | Takeuchi ................ B60L 50/66 310/156.43 |
| 2012/0033236 | A1 | 2/2012 | Tsugimura |
| 2012/0041062 | A1 | 2/2012 | Zhou et al. |
| 2012/0212080 | A1* | 8/2012 | Jiang ...................... H02K 5/148 310/43 |
| 2012/0217831 | A1 | 8/2012 | Jore et al. |
| 2012/0262019 | A1 | 10/2012 | Smith et al. |
| 2012/0262020 | A1 | 10/2012 | Smith et al. |
| 2013/0049500 | A1 | 2/2013 | Shan et al. |
| 2013/0052491 | A1 | 2/2013 | Bull et al. |
| 2013/0053942 | A1 | 2/2013 | Kamel et al. |
| 2013/0062984 | A1* | 3/2013 | Tremelling .............. H02K 1/12 310/156.28 |
| 2013/0072604 | A1 | 3/2013 | Bowen, III et al. |
| 2013/0076192 | A1 | 3/2013 | Tanimoto |
| 2013/0119802 | A1 | 5/2013 | Smith et al. |
| 2013/0214631 | A1 | 8/2013 | Smith et al. |
| 2013/0234566 | A1 | 9/2013 | Huang et al. |
| 2014/0021968 | A1 | 1/2014 | Lee |
| 2014/0021969 | A1 | 1/2014 | Tseng et al. |
| 2014/0021972 | A1 | 1/2014 | Barabi et al. |
| 2014/0028149 | A1 | 1/2014 | Oyague |
| 2014/0042868 | A1 | 2/2014 | Sullivan et al. |
| 2014/0152136 | A1 | 6/2014 | Duford et al. |
| 2014/0175922 | A1 | 6/2014 | Jore et al. |
| 2014/0201291 | A1 | 7/2014 | Russell |
| 2014/0262499 | A1 | 9/2014 | Smith et al. |
| 2014/0268460 | A1 | 9/2014 | Banerjee et al. |
| 2014/0300223 | A1 | 10/2014 | Yamada et al. |
| 2014/0368079 | A1 | 12/2014 | Wong et al. |
| 2015/0084446 | A1 | 3/2015 | Atar |
| 2015/0188375 | A1 | 7/2015 | Sullivan et al. |
| 2015/0188391 | A1 | 7/2015 | Carron et al. |
| 2015/0311756 | A1 | 10/2015 | Sullivan |
| 2015/0318751 | A1 | 11/2015 | Smith et al. |
| 2016/0247616 | A1 | 8/2016 | Smith et al. |
| 2016/0285327 | A1 | 9/2016 | Sasaki et al. |
| 2016/0372995 | A1 | 12/2016 | Smith et al. |
| 2017/0040878 | A1 | 2/2017 | Smith et al. |
| 2017/0047792 | A1* | 2/2017 | Klassen .................. H02K 1/32 |

FOREIGN PATENT DOCUMENTS

| | | | |
|---|---|---|---|
| CN | 103248182 A | 8/2013 | |
| CN | 103580412 A | 2/2014 | |
| CN | 104426263 A | 3/2015 | |
| CN | 104467243 A | 3/2015 | |
| DE | 19954196 A1 * | 6/2000 | ............ H02K 21/24 |
| EP | 0563852 A1 | 10/1993 | |
| EP | 1086523 | 3/2001 | |
| EP | 2696481 | 12/2014 | |
| EP | 2882079 A2 | 6/2015 | |
| FR | 2262880 A1 | 9/1975 | |
| GB | 2030790 A | 4/1980 | |
| GB | 2485185 A | 5/2012 | |
| JP | 58036145 A | 3/1983 | |
| JP | 59213287 A | 12/1984 | |
| JP | 2008301666 A | 12/2008 | |
| JP | 2008301666 A * | 12/2008 | |
| JP | 4639632 B2 | 2/2011 | |
| WO | 2004073365 A2 | 8/2004 | |
| WO | 2009068079 A1 | 6/2009 | |

OTHER PUBLICATIONS

JP2008301666A (English Translation) (Year: 2008).*
International Search Report and Written Opinion of International Application No. PCT/US2018/034569 dated Aug. 30, 2018.
European Search Report dated Mar. 26, 2021 for European Patent Application No. 18731306.9.

* cited by examiner

PRE-WARPED ROTORS FOR CONTROL OF MAGNET-STATOR GAP IN AXIAL FLUX MACHINES

RELATED APPLICATIONS

This application claims the benefit under 35 U.S.C. § 119(e) of each of (A) U.S. Provisional Patent Application 62/515,251, entitled PRE-WARPED ROTORS FOR CONTROL OF MAGNET-STATOR GAP IN AXIAL FLUX MACHINES, filed Jun. 5, 2017, and (B) U.S. Provisional Patent Application 62/515,256, entitled AIR CIRCULATION IN AXIAL FLUX MACHINES, filed Jun. 5, 2017. The contents of each of the foregoing applications are incorporated herein by reference, in their entireties, for all purposes.

BACKGROUND

Axial flux motors and generators commonly employ a stator that is positioned in a gap formed between a pair of opposing magnets that generate magnetic flux, and a rotor that supports the magnets and allows them to rotate in unison relative to the stator. An example of such an axial flux motor or generator 100 is shown in FIGS. 1 and 2. As shown, the motor or generator 100 includes a pair of annular magnets 102a, 102b positioned on either side of a stator 104. The magnets 102a, 102b are supported by respective rotor plates 106a, 106b that are fixedly attached to a shaft 108. The magnets 102a, 102b, stator 104, and rotor plates 106a, 106b are all contained within a case 110. The periphery of the stator 104 is affixed between two parts 110a, 110b of the case 110, so the stator 104 remains stationary with respect to the case 110.

Together, the magnets 102a, 102b, the rotor plates 106a, 106b, and the shaft 108 form a "rotor assembly" which can rotate relative to the stator 104 and the case 110. As shown in FIG. 2, a slight clearance 112a between a top of the rotor plate 106a and an inside surface of the upper case half 110a and a slight clearance 112b between a bottom of the rotor plate 106 and an inside surface of the lower case half 110b allows the rotor assembly to rotate relative to the case 110. Similarly, a slight clearance 114a between a bottom of the magnet 102a and the top of the stator 104 (as well as between the exposed bottom portion of the rotor plate 106a and the top of the stator 104) and a slight clearance 114b between a top of the magnet 102b and the bottom of the stator 104 (as well as between the exposed top portion of the rotor plate 106b and the bottom of the stator 104) allows the rotor assembly to rotate relative to the stator 104. Support bearings 116a, 116b between the shaft 108 and the case 110 allow the rotor assembly to rotate freely with respect to the stator 104 and the case 110 in a controlled fashion.

SUMMARY

In some embodiments, an assembly for use in an axial flux motor or generator comprises a rotor plate and a magnet, the magnet having a surface that is orthogonal to a magnetization direction of the magnet. The rotor plate is adapted to engage a rotor shaft that rotates about an axis of rotation, and the magnet is attached to the rotor plate. The rotor plate and magnet are configured and arranged such that, if the rotor plate and the magnet are separated from all other magnetic field generating components, then a distance between a first plane that intercepts a first point on the surface and to which the axis of rotation is normal and a second plane that intercepts a second point on the surface and to which the axis of rotation is normal is substantially greater than zero.

In some embodiments, a method for forming an assembly for use in an axial flux motor or generator comprises attaching a magnet to a rotor plate, the magnet having a surface that is orthogonal to a magnetization direction of the first magnet. The rotor plate is adapted to engage a rotor shaft that rotates about an axis of rotation, and is configured such that, after the magnet is attached to the rotor plate, a distance between a first plane that intercepts a first point on the surface and to which the axis of rotation is normal and a second plane that intercepts a second point on the surface and to which the axis of rotation is normal is substantially greater than zero.

DETAILED DESCRIPTION

Figure 1:
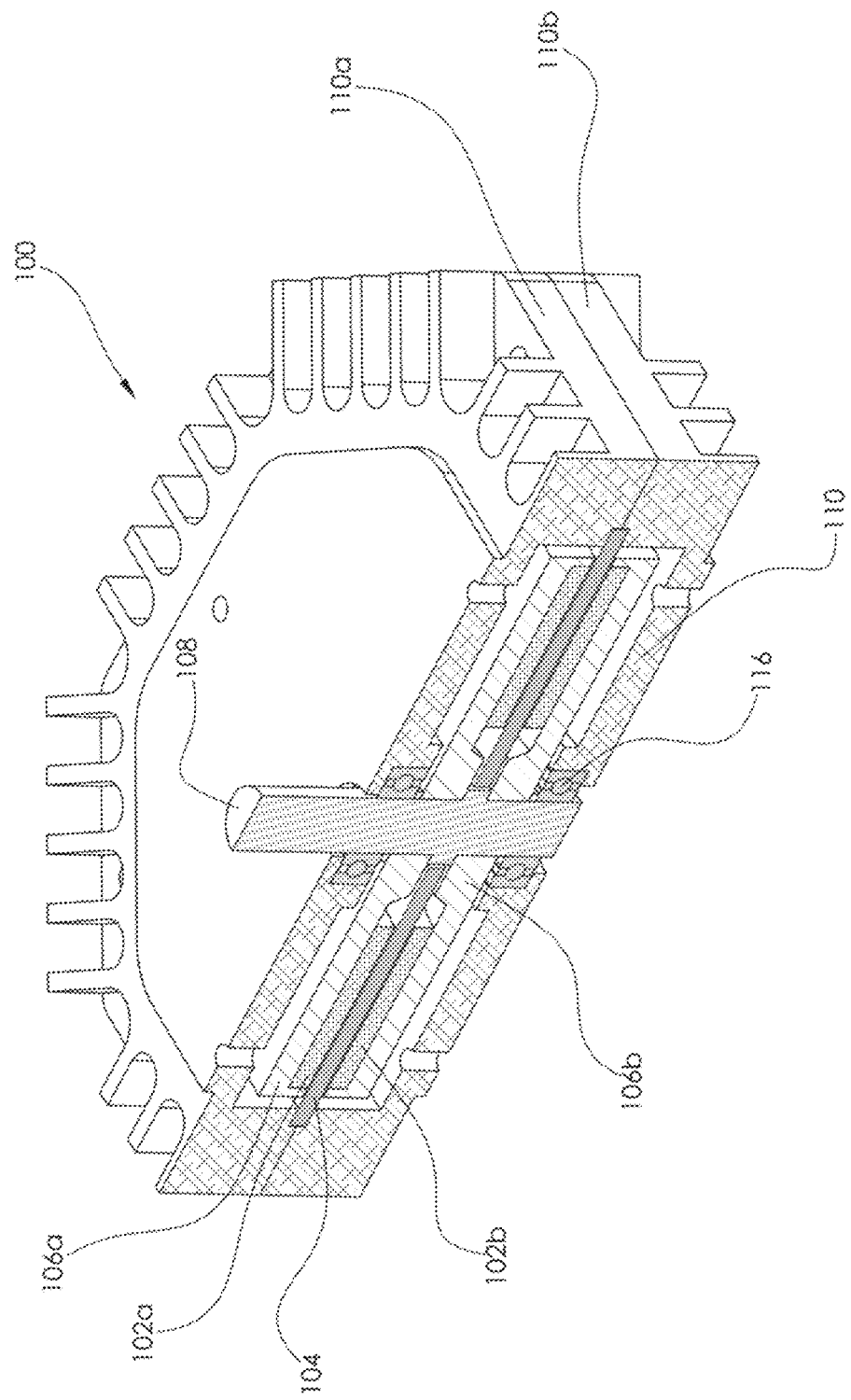
FIG. 1 shows a cutaway perspective view of an axial flux motor or generator.

Axial flux motors and generators described by several patents, including U.S. Pat. No. 7,109,625 ("the '625 patent"), which is incorporated herein by reference in its entirety, feature a generally planar printed circuit board stator assembly interposed between magnets magnetized with alternating north-south poles. These magnets are affixed to a shaft via "back-irons" for connection to the mechanical load (or source for a generator). Such back-irons provide a flux return path and may correspond, for example, to the rotor plates 106a, 106b shown in FIGS. 1 and 2. The magnetic flux density in the gap is largely dependent on the spacing between the two magnets. A smaller gap allows the use of smaller, lighter magnets for the same flux density. Gap sizes as small as 0.02 inches from stator to magnet on either side have been used. The inventor has recognized and appreciated that when the magnets are placed in this configuration, the circular rotor elements bend due to the magnetic attraction force between them. This bending reduces the gap size at the outer radius of the magnet, an area already prone to rubbing due to dimensional variations elsewhere. This can lead to magnet-stator contact during motor operation.

Disclosed are apparatuses and techniques for maintaining a consistent gap between the rotor and stator in an axial flux motor or generator without adding to the overall mass or thickness of the motor or generator. In some implementations, a machined face on the rotor plates (e.g., back-irons) can be used to achieve a pre-warped state such that, when assembled, the force of the magnets bends the rotor plates into the position which results in the desired gap. In some embodiments, a circular, cone-shaped taper may be machined onto the surface of a previously flat rotor plate surface thereby creating a warped surface which, when assembled into the motor or generator and acted on by the magnetic force, is bent into a substantially parallel or other desired state. Alternatively, tapered rotor plates can be formed by molding the rotor plates into the desired tapered configuration.

As noted, the gap between the magnets in an axial flux motor or generator can be an important design parameter in the machine. The amount of torque which can be produced, for a given current density in the stator, is proportional to the magnetic field in the gap. The size of this gap can have a large influence on the strength of the magnetic field, making it generally desirable to reduce the gap size as much as possible. This presents a problem in that as the gap size is reduced, the same magnetic field increase exerts a greater force on the rotor plates causing bending of the plates. FIG. 3 shows a cutaway side view of a portion of a simplified axial flux motor or generator like that shown in FIGS. 1 and 2, but in which the size of the gap and the amount of deflection are exaggerated to illustrate the nature of the problem. In machines which seek to reduce the rotor-stator gap as much as possible, bending of this type can result in an inconsistent magnetic field strength and even rubbing of the magnets on the stator. This rubbing can damage the stator, produce an audible scraping noise, and result in reduced efficiency.

Previous solutions have been to increase the size of the gap or increase the bending strength of the rotor plates. Each of these solutions has undesirable consequences. The first conventional solution, i.e., increasing the gap size, for reasons stated above, results in a reduction in magnetic field strength for a given magnet size. The second conventional solution, i.e., increasing the rotor bending strength, necessitates an increase in thickness of the rotor which increases the overall mass of the machine and reduces the desirable slim form factor. It can also necessitate the use of more complex manufacturing processes, adding to the overall cost. In the motor or generator 100 shown in FIG. 2, for example, each of the rotor plates 106a, 106b is provided with a rim 115 and a region 118 of increased thickness near the center of the rotor plates 106a, 106b. These methods still result in a gap with a decreasing width as a function of radius, addressing the symptoms rather than the problem of a non-uniform gap.

Figure 2:
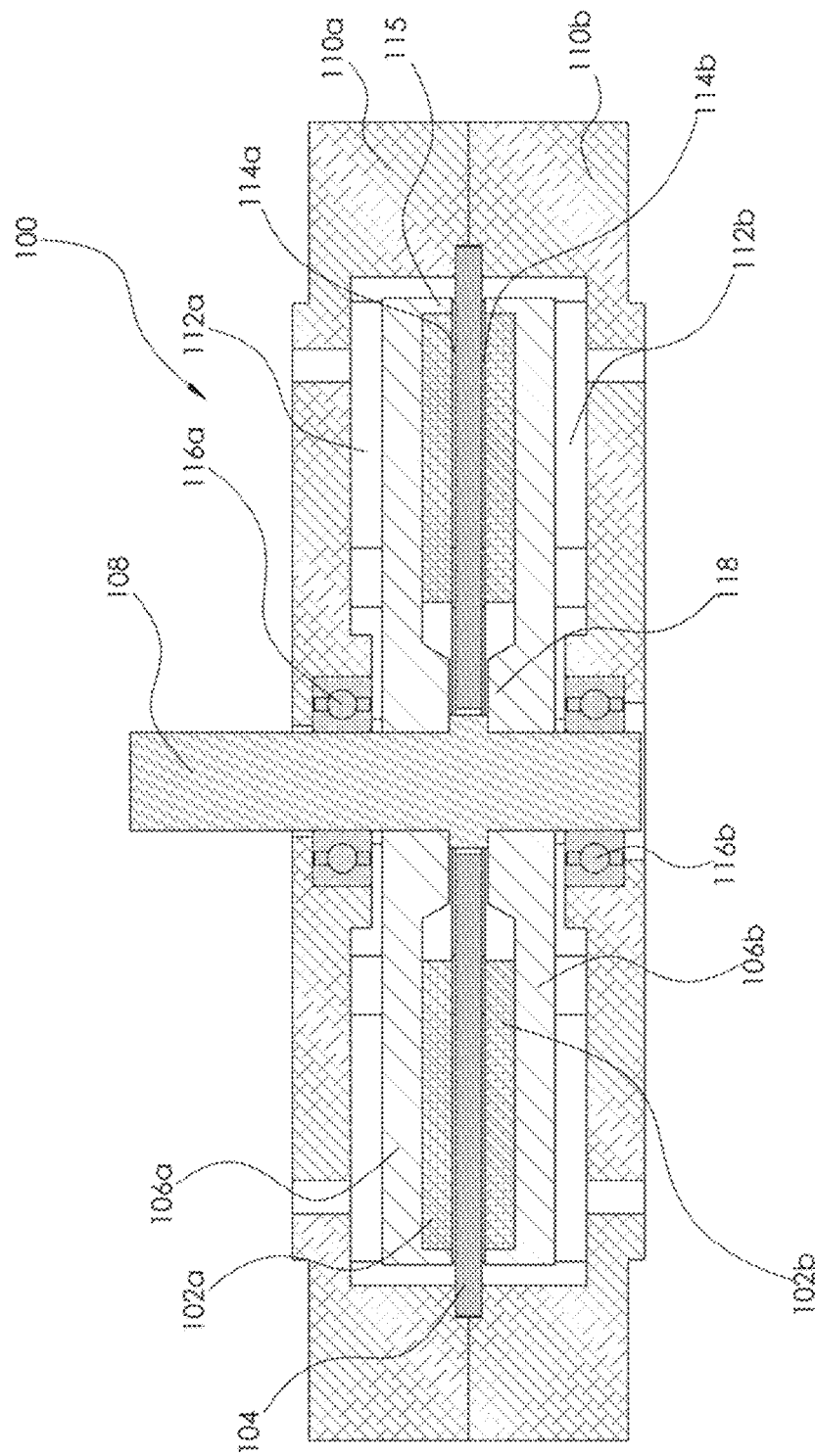
FIG. 2 shows a cutaway side view of the axial flux motor or generator shown in FIG. 1.
Figure 3:
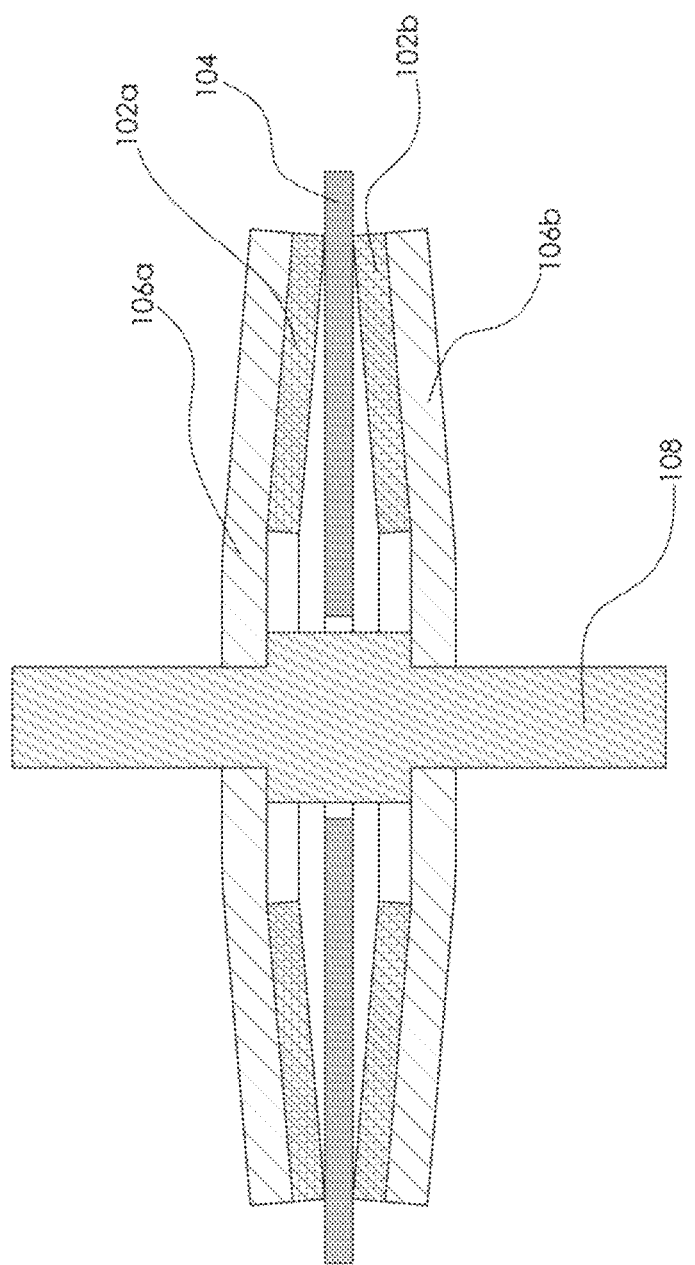
FIG. 3 shows a cutaway side view of a portion of an axial flux motor or generator like that shown in FIGS. 1 and 2, with an exaggerated gap and rotor deflection.

As shown in FIGS. 1 and 2, in some axial flux machines, bearings 116a, 116b are utilized to support the rotor plates 106a, 106b and attached magnets 102a, 102b. These bearings 116a, 116b are supported by the respective case parts 110a, 110b which come together, clamping the stator 104 around its periphery. Rotor-stator alignment is determined by the alignment of the shaft 108 to the bearings 116a, 116b. The bearings 116a, 116b have some amount of radial runout, which increases as the bearings wear. Additionally, there will often be some degree of misalignment between the two bearings 116a, 116b due to tolerancing in the case 110. When assembled into a thin motor or generator, as these designs typically are, the effects of the runout and misalignment are magnified at the outer radius of the stator-magnet gap and can lead to the rubbing noted above. This disclosure provides a method for directly addressing this problem without a reduction of the magnetic field or increase in mass, in at least some embodiments.

Figure 4:
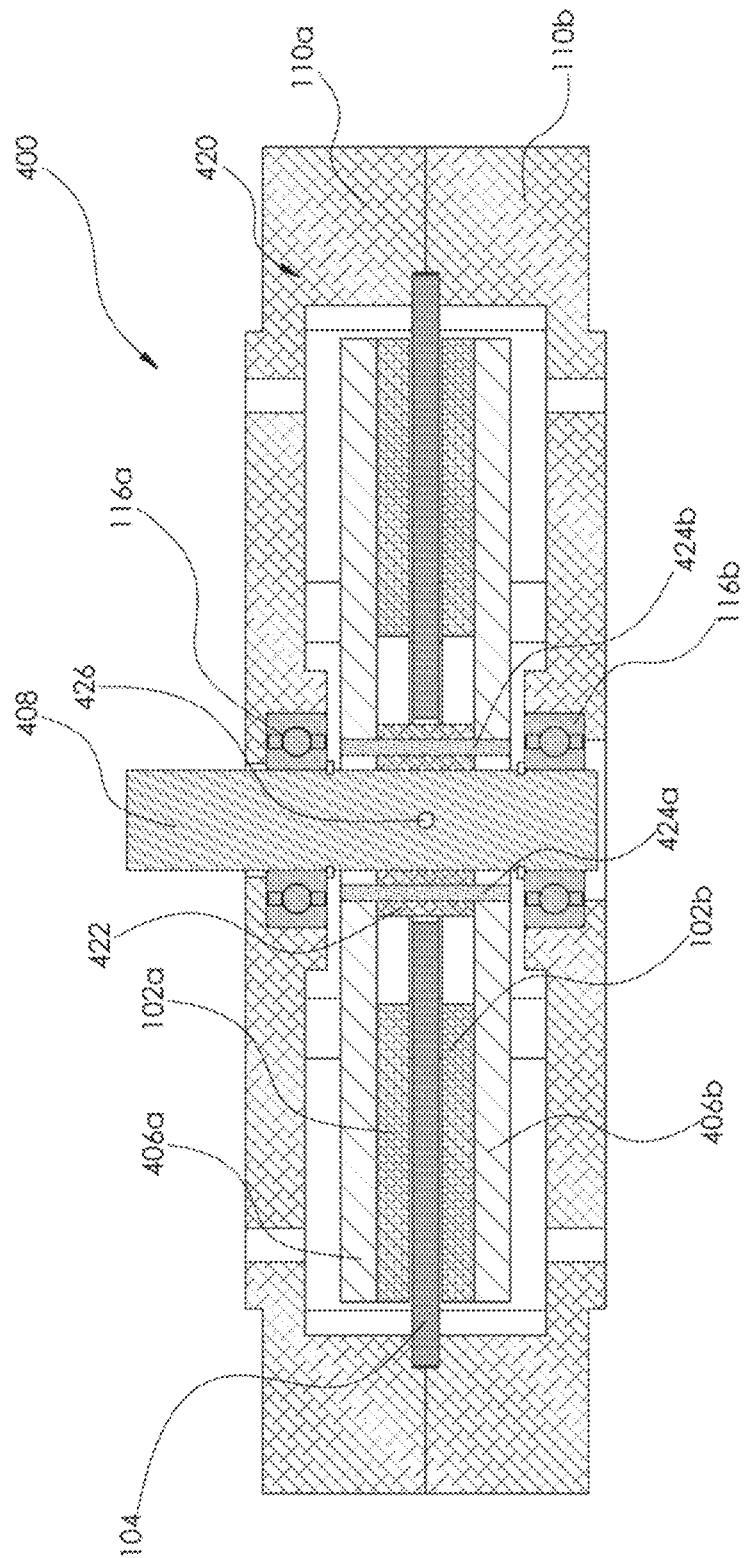
FIG. 4 shows a cutaway side view of an axial flux motor or generator employing an example of a pre-warped rotor element as disclosed herein.

FIG. 4 is a cutaway side view of example embodiment of a motor or generator 400 incorporating a pre-warped rotor elements in accordance with the present disclosure. As can be seen, the motor or generator 400 has several components in common with the motor or generator 100 shown in FIGS. 1 and 2, but also has several salient differences. One difference between the two designs relates to the configuration of the hub 422 in the motor or generator 400. As shown, the hub 422 may be used to tie together the rotor plates 406a, 406b and the shaft 408, with pins 424a, 424b being used to index the rotor plates 406a, 406b to the hub 422 as well as to each other, and with pin 426 being used to index the hub 422 to the shaft 408. In addition, pre-warping of the rotor elements prior to assembly (as discussed in more detail below) allows the rotor plates 406a, 406b in the motor or generator 400 to be less bulky and/or less complex than the rotor plates 106a, 106b in the motor or generator 100, thus allowing the motor or generator 400 to achieve a slimmer form factor and/or be less difficult and/or expensive to manufacture. In the example embodiment shown in FIG. 4, for instance, the rotor plates 406a, 406b do not include the rim 115 or region 118 of increased thickness near the center of the rotor plates 106a, 106b shown in FIG. 2.

Assemblies including pre-warped rotor elements as described herein can be employed in any known or future developed motor or generator, including the axial flux motors/generators described in the '625 patent, as well as the motors and generators described in U.S. Pat. Nos. 9,673,684 and 9,800,109, the entire contents of each of which are incorporated herein by reference.

Figure 5A:
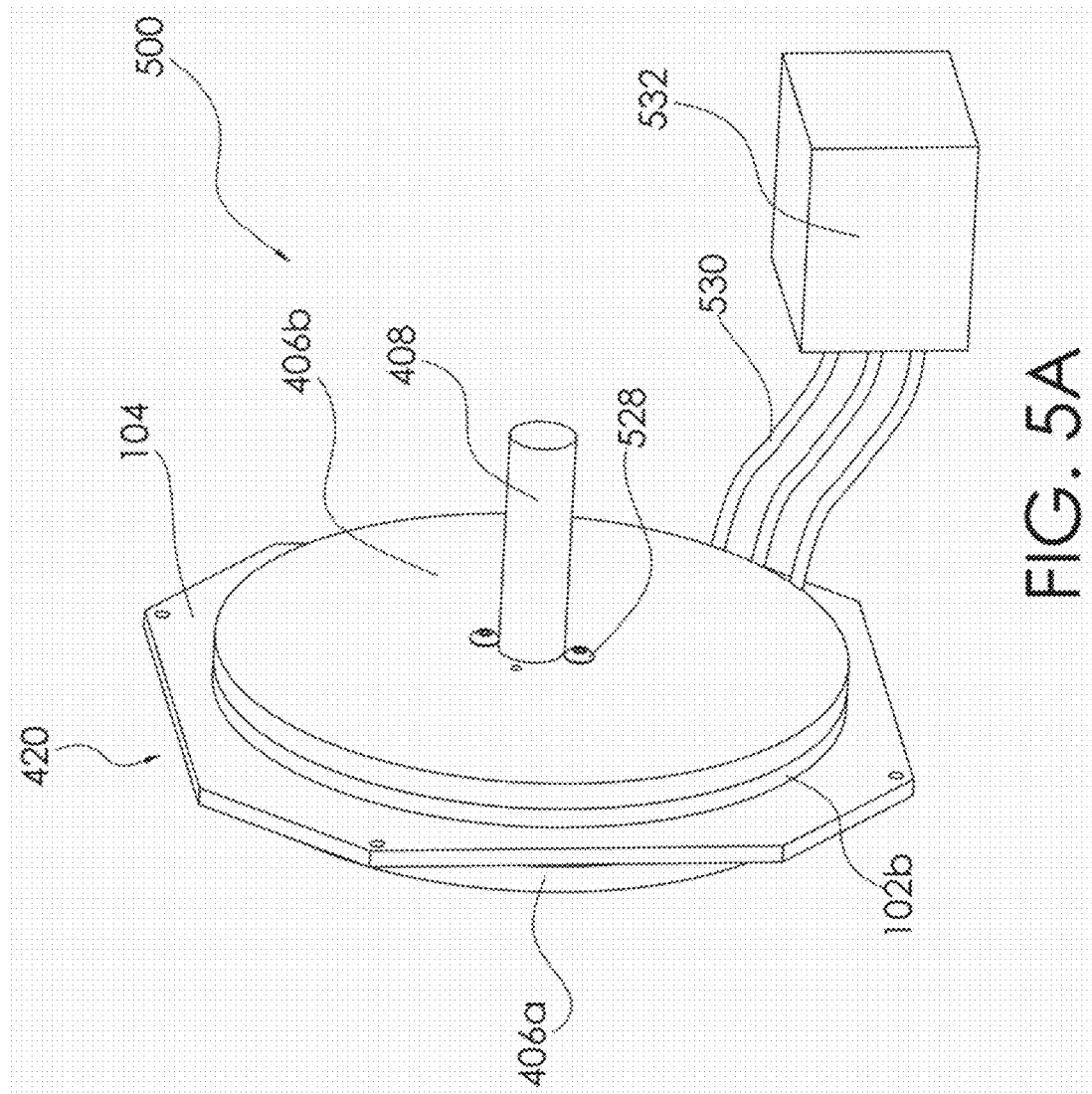
FIG. 5A shows a perspective view of a system including a controller in addition to components of the motor or generator shown in FIG. 4.
Figure 5B:
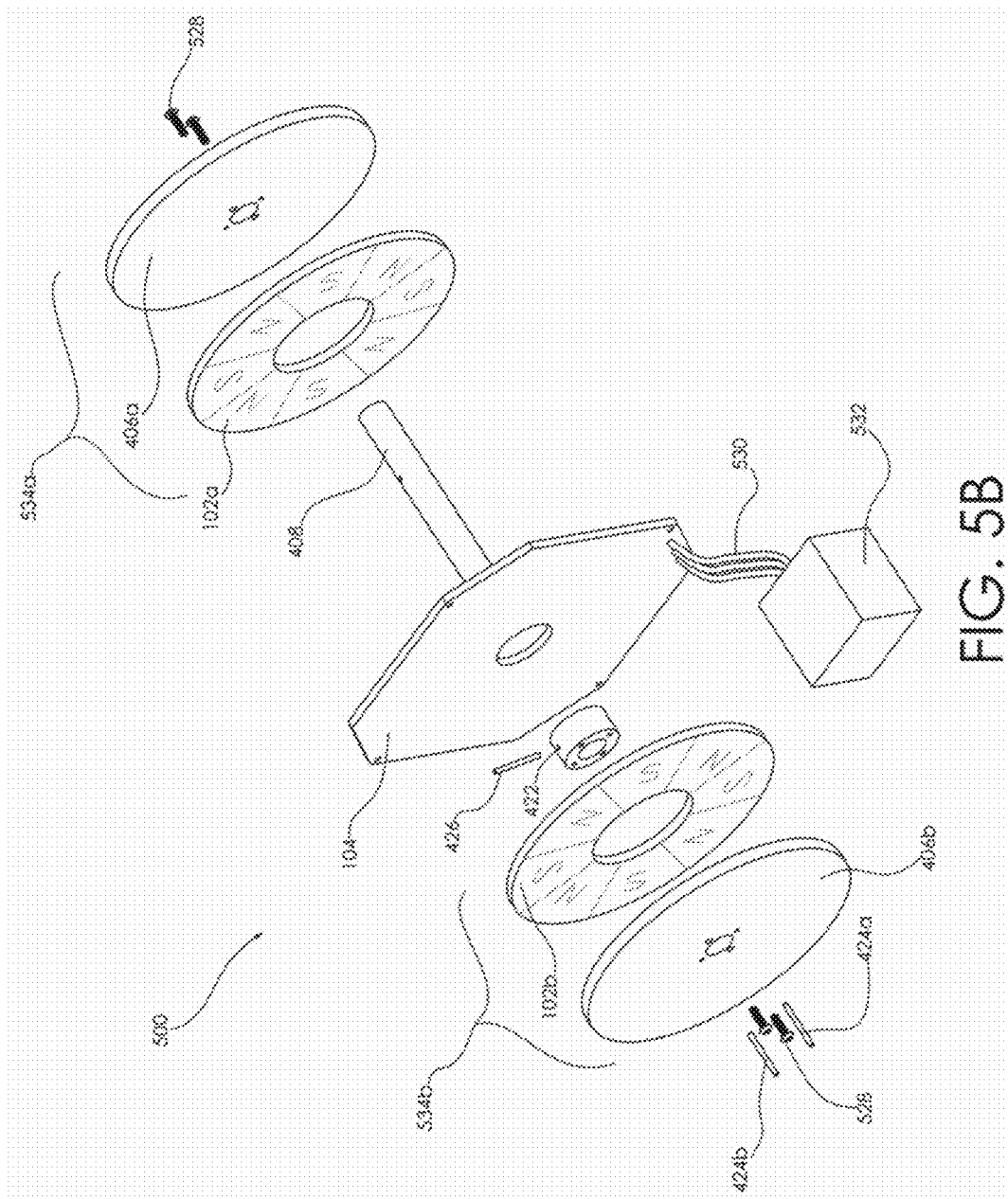
FIG. 5B shows an expanded view of the system shown in FIG. 5A.

FIG. 5A shows an example of a system 500 including a controller 532 in addition to a motor or generator 420 like that shown in FIG. 4. An expanded view showing the components of the motor or generator 420 and the manner in which they can be assembled is shown in FIG. 5B. As shown, the stator 104 may be disposed in a gap between two pre-warped rotor elements 534a, 534b that each includes a magnet 102a, 102b attached to a respective rotor plate 406a, 406b. The pattern of magnetic poles in the magnets 102a, 102b is also evident in the expanded view of FIG. 5B. Screws or other fasteners 528 may be used to secure the rotor elements 534a, 534b to the hub 422 and pins 424a, 424b and 426 may be used to index the rotor elements and shaft as discussed above.

In the illustrated embodiment, the electrical connections 530 are taken at the outer radius of the stator 104, and the stator is mounted to a frame or case at the outer periphery. Another useful configuration, the "out-runner" configuration, involves mounting the stator 104 at the inner radius, making electrical connections 530 at the inner radius, and replacing the shaft 408 with an annular ring (not shown) separating the rotor halves. It is also possible to configure the system with just one magnet, either 102a or 102b, or to interpose multiple stators between successive magnet assemblies. Wires 530 may also convey information about the position of the rotor based on the readings of Hall-effect or similar sensors (now shown) mounted on the stator. Additionally or alternatively, an encoder (not shown) may be attached to the shaft 408 and provide position information to the controller 532.

The system 500 in FIGS. 5A and 5B can function either as a motor, or a generator, depending on the operation of the controller 532 and components connected to the shaft 408. As a motor system, the controller 532 may operate switches so that the currents in the stator 104 create a torque about the shaft 408 due to the magnetic flux in the gap originating from the magnets 102a, 102b connected to the shaft 408. Depending on the design of the controller 532, the magnetic flux in the gap and/or the position of the rotor may be measured or estimated to operate the switches to achieve torque output at the shaft 408. As a generator system, a source of mechanical rotational power connected to the shaft 408 creates voltage waveforms at the terminals of the stator. These voltages can either be directly applied to a load, or they can be rectified with a three-phase (or poly phase) rectifier within the controller 532. The rectifier implementation may, for example, be "self-commutated" using diodes in generator mode, or may be constructed using the controlled switches of the motor controller, but operated such that the shaft torque opposes the torque provided by the mechanical source, and mechanical energy is converted to electrical energy. Thus, an identical configuration in FIG. 5A may function as both a generator and motor, depending on how the controller 532 is operated. Additionally, in some embodiments the controller 532 may include filter components that mitigate switching effects, reduce EMI/RFI from the wires 530, reduce losses, and provide additional flexibility in the power supplied to or delivered from the controller 532.

Figure 6:
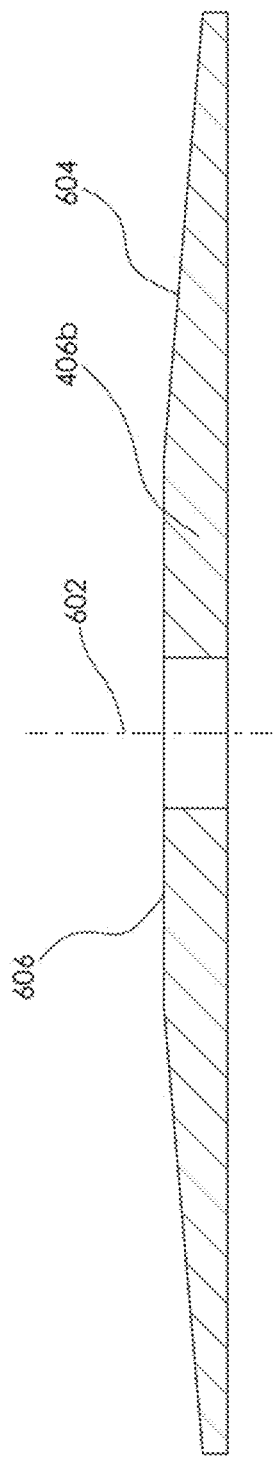
FIG. 6 shows cutaway side view of an example of a rotor plate having a tapered region to allow the formation of a pre-warped rotor element as disclosed herein.
Figure 7:
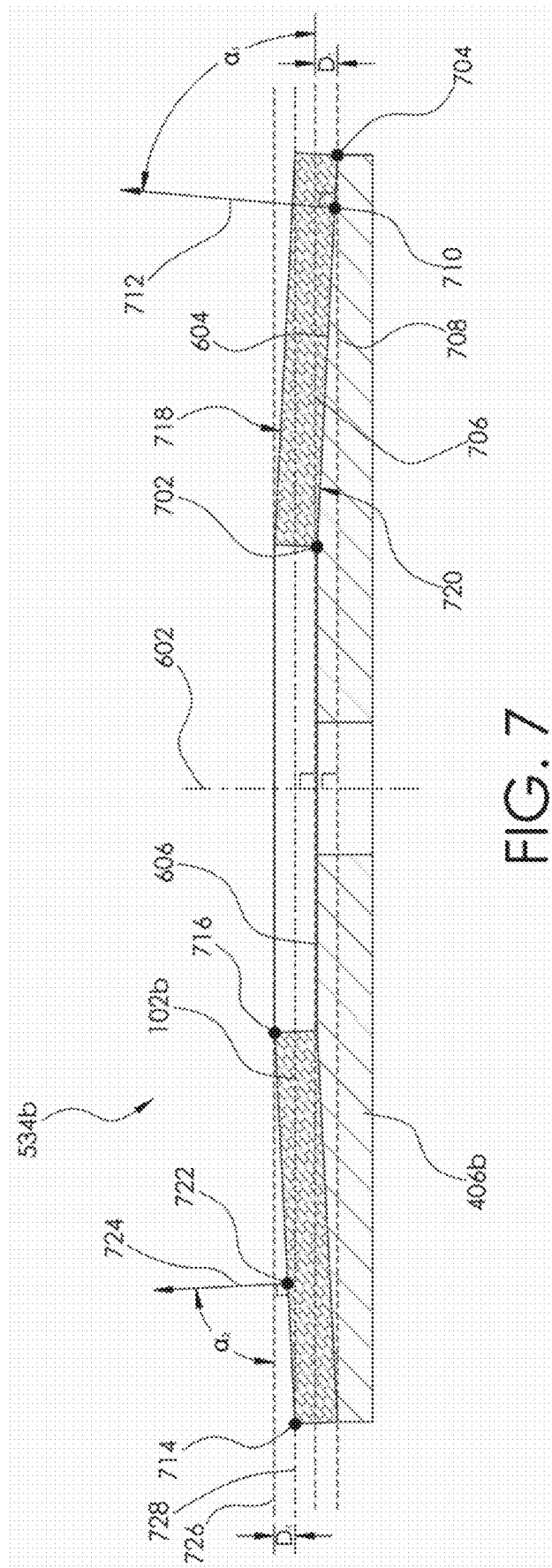
FIG. 7 shows a cutaway side view of an example of a pre-warped rotor element as disclosed herein.

FIGS. 6 and 7 illustrate an example method for forming a pre-warped rotor element 534b including a rotor plate 406b and a magnet 102b. A similar technique may be employed to form the pre-warped rotor element 534a located on the other side of the gap in which the stator is disposed (e.g., see FIGS. 10-12). Examples of techniques for aligning the magnets 102a, 102b to the rotor plates 406a, 406b during assembly are described, for example, in U.S. Pat. No. 9,673,688, the entire contents of which are incorporated herein by reference.

Figure 8:
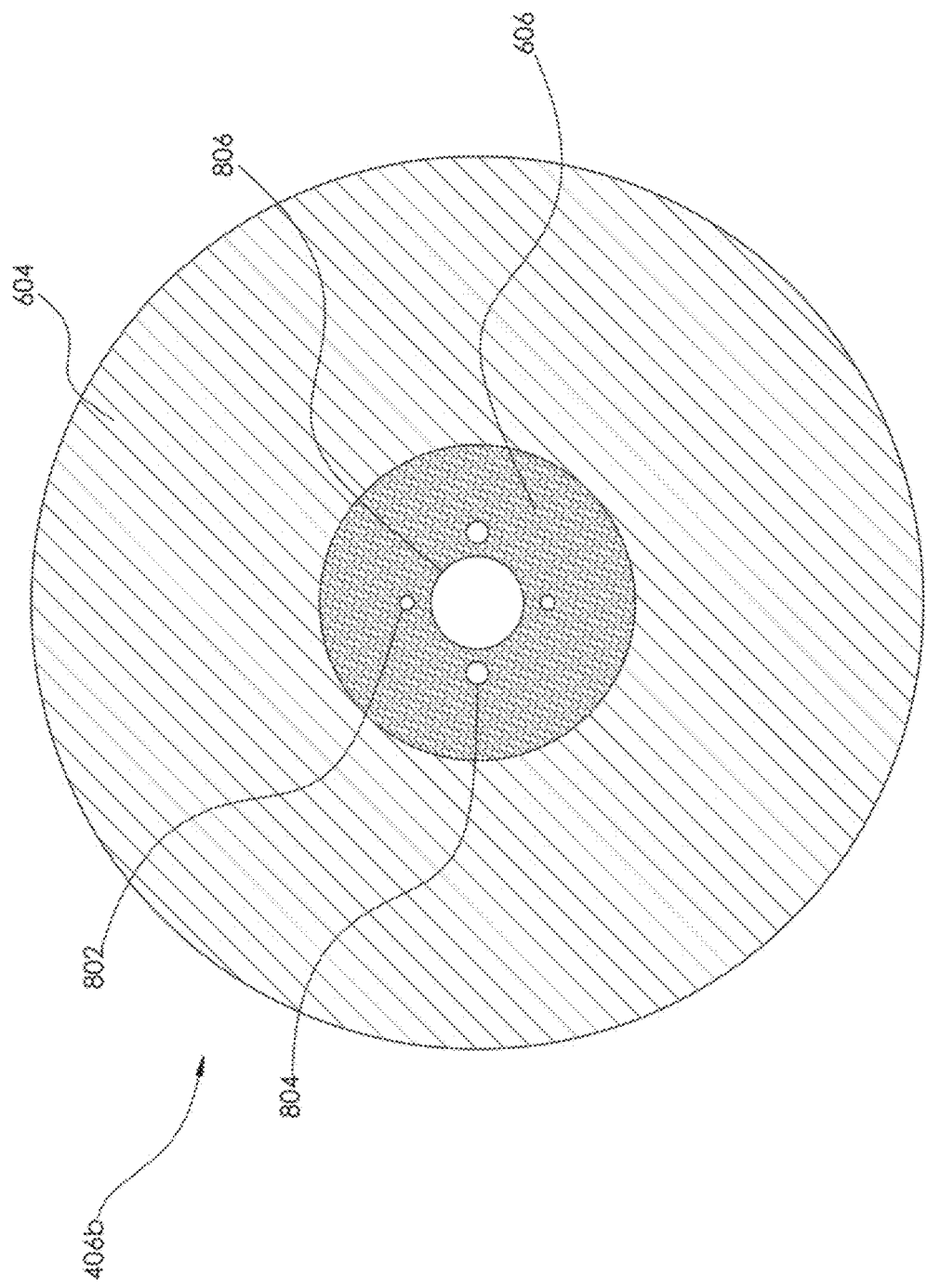
FIG. 8 shows a top view of an example of a rotor plate such as that shown in FIG. 6.

As seen in FIG. 6, the rotor plate 406b may be formed to include a surface region 604 that is tapered with respect to a plane to which an axis of rotation 602 of the rotor shaft is normal, as well as a central region 606 having a generally flat surface that is parallel to such a plane. A top view of the rotor plate 406b, including the tapered surface region 604 and the central region 606, is shown in FIG. 8. The rotor plate 406b may additionally include holes 802 to receive the pins 424a, 424b, holes 804 to receive the screws 528, and a hole 806 to receive the shaft 408, all within the central region 606. The tapered surface region 604 may take on any of numerous forms and the invention is not limited to any particular configuration or type of taper. In the illustrative embodiment shown, the upper portion of the rotor plate 406 is in the shape of a right, conical frustum, with a top of the central region 606 forming the frustum's upper base. Other configurations are, however, possible and contemplated.

Figure 9:
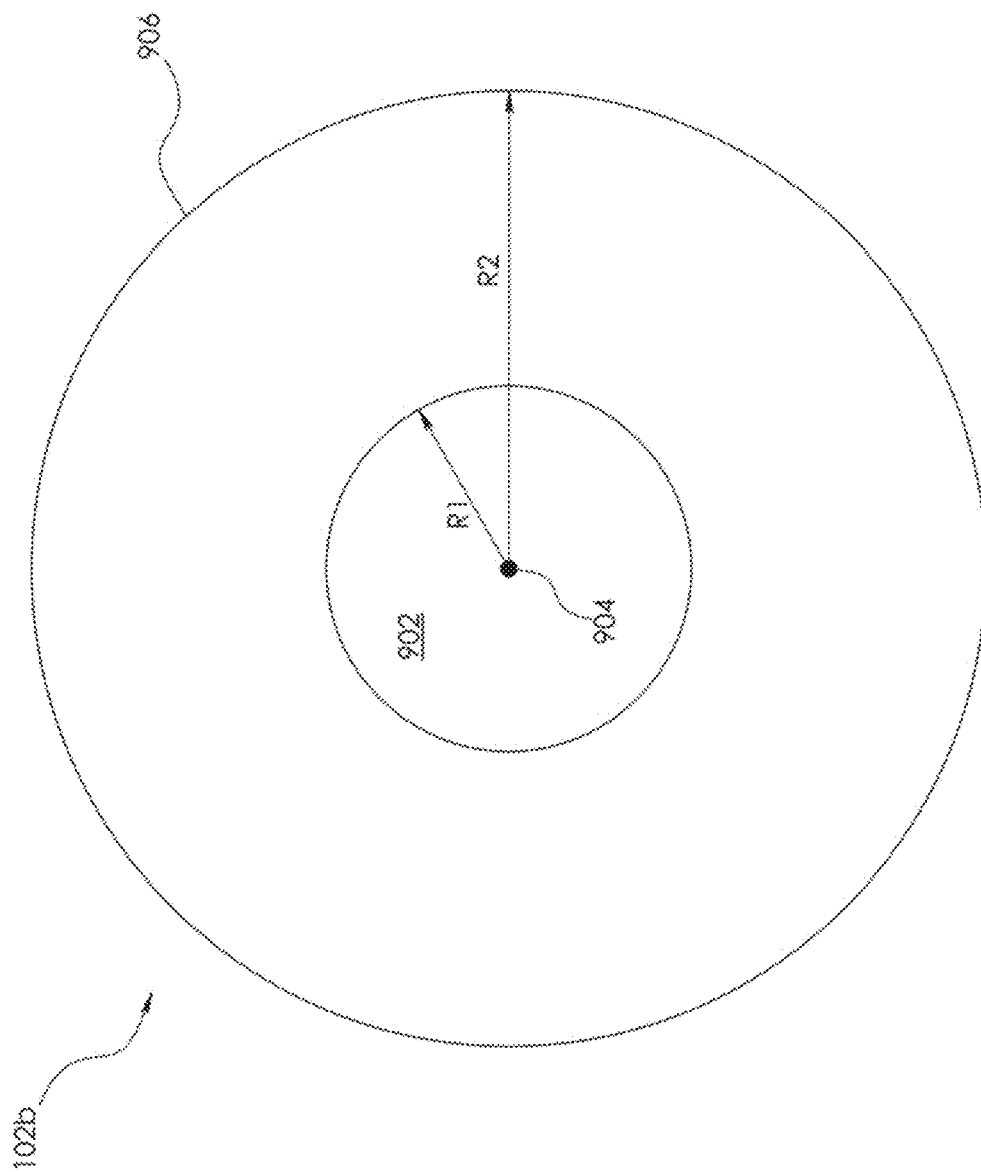
FIG. 9 shows a top view of an annular magnet that may be employed in some embodiments.

As illustrated in FIG. 7, a magnet 102b may be attached to the upper surface of the rotor plate 406b so that it contacts at least a portion of the tapered surface region 604. In the embodiment illustrated, the magnet 102b has an annular shape that covers substantially all of the tapered (e.g., conical) region 604. A top view of the annular magnet 102b is shown in FIG. 9. As shown, the circular hole 902 in the magnet 102b has a radius R1 measured from a center point 904 and the circular outer perimeter 906 of the magnet 102b has a radius R2. Attaching the annular magnet 102b to the tapered region 604 as shown in FIG. 7 will cause the magnet 102b to warp and at least partially conform to a shape of the conical tapered region 604. This warping of the magnet will stress and warp the body of the rotor plate 406b.

As shown in FIG. 7, a degree of the taper of the surface region 604 may be measured by identifying two points 702, 704 on the surface of the of the rotor plate 406b that contact the magnet's lower surface 720, and determining a distance $D_1$ between two planes 706, 708 to which the axis of rotation 602 is normal and that intercept the first point 702 and the second point 704, respectively. In the example shown, the magnet's lower surface that contacts the conical tapered region 604 is orthogonal to the magnetization direction of the magnet 102b. In some embodiments, two magnet contact points 702, 704 can be found (at the inner radius R1 and the outer radius R2 of the magnet, or elsewhere) for which the distance $D_1$ is substantially greater than zero. The term "substantially" in this context is intended to exclude slight variations due to processing and/or material imperfections within allowable tolerances. In some implementations, the distance $D_1$ may, for example, be greater than 0.003 inches, or greater than 0.01 inches, or even greater than 0.02 inches. Additionally or alternatively, in some embodiments, two magnet contact points 702, 704 can be found such that a ratio of the distance $D_1$ to the distance between the two points, and/or to the difference between the inner radius R1 and outer radius R2 of the magnet, is substantially greater than zero. In some implementations, such ratio may, for example, be greater than 0.002, or greater than 0.005, or even greater than 0.01.

As also illustrated in FIG. 7, in some embodiments, at least one point 710 can be found on a surface of the rotor plate 106b that contacts the magnet 102b for which a ray 712 that extends away from and is normal to the surface forms an angle $\alpha_1$ with a plane to which the axis of rotation 602 is normal that is substantially less than 90 degrees. In some implementations, the angle $\alpha_1$ may, for example, be less than 89.9 degrees, less than 89.7 degrees, or even less than 89.5 degrees. The point 710 may be located at the inner radius R1 of the magnet 102b, at the outer radius R2 of the magnet 102b, or at some point between those two radii.

Additionally or alternatively, and as also shown in FIG. 7, a degree of the taper of the magnet 102b, when attached to the rotor plate 406b, may be measured by identifying two points 714, 716 on a surface of the magnet 102b that is orthogonal to a magnetization direction of the magnet 102b, e.g., the upper surface 718 of the magnet 102b shown in FIG. 7, and determining a distance $D_2$ between two planes 726, 728 to which the axis of rotation 602 is normal and that intercept the first point 714 and the second point 716, respectively. In the example shown, the magnet's lower surface 720 that contacts the conical tapered region 604 is also orthogonal to the magnetization direction of the magnet 102b. In some embodiments, two magnet surface points 714, 716 can be found (at the inner radius R1 and the outer radius R2 of the magnet, or elsewhere) for which the distance $D_2$ is substantially greater than zero. In some implementations, the distance $D_2$ may, for example, be greater than 0.002 inches, or greater than 0.005 inches, or even greater than 0.01 inches. Additionally or alternatively, in some embodiments, two magnet surface points 714, 716 can be found such that a ratio of the distance $D_2$ to the distance between the two points, and/or to the difference between the inner radius R1 and outer radius R2 of the magnet, is substantially greater than zero. In some implementations, such ratio may, for example, be greater than 0.002, or greater than 0.005, or even greater than 0.01.

As also illustrated in FIG. 7, in some embodiments, at least one point 722 can be found on a surface of the magnet 102b that is orthogonal to a magnetization direction of the magnet 102b, e.g., the upper surface 718, for which a ray 724 that extends away from and is normal to the magnet's surface forms an angle $\alpha_2$ with a plane to which the axis of rotation 602 is normal that is substantially less than 90 degrees. In some implementations, the angle $\alpha_2$ may, for example, be less than 89.9 degrees, less than 89.7 degrees, or even less than 89.5 degrees. The point 722 may be located at the inner radius R1 of the magnet 102b, at the outer radius R2 of the magnet 102b, or at some point between those two radii.

Figure 10:
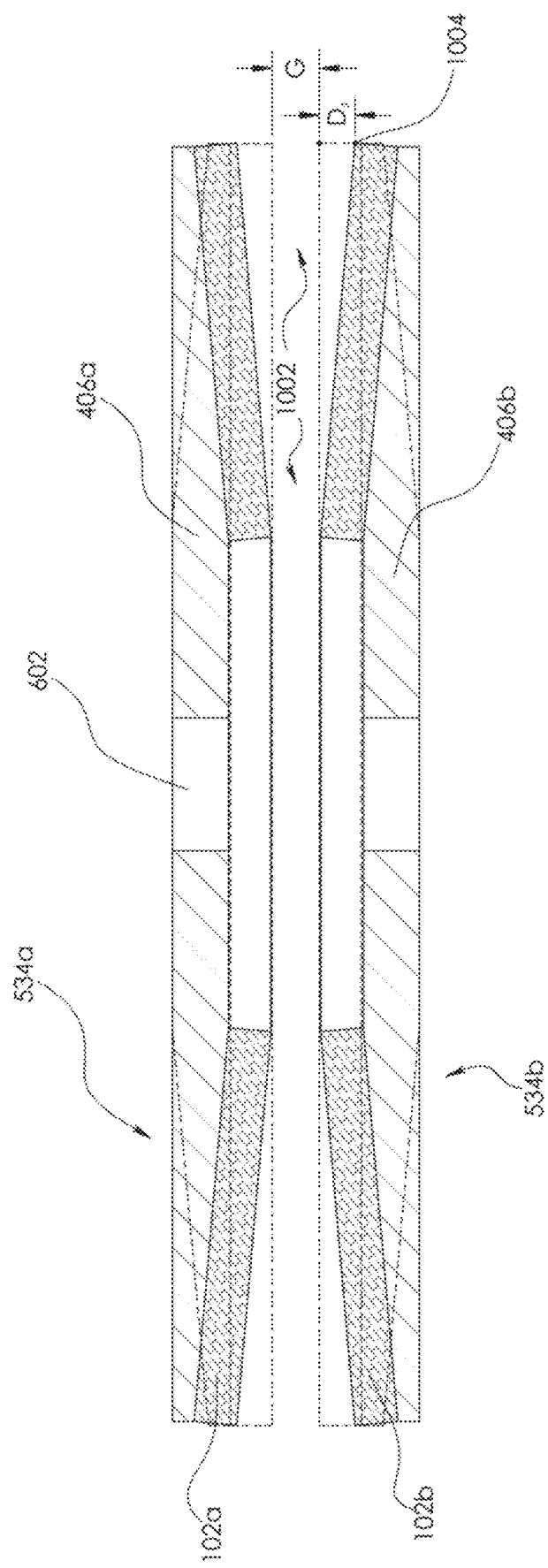
FIG. 10 shows a cutaway side view of a pair of pre-warped rotor elements, illustrating how the rotor elements may bend into a desired configuration when they are incorporated into a rotor assembly.

As illustrated in FIG. 10, when the two rotor elements 534a, 534b are attached to a shaft 408 and hub 422 (not shown in FIG. 10), the magnetic flux of the magnets 102a, 102b generates an attractive force in a gap 1002 between the magnets that causes the rotor elements 534a, 534b to warp such that the ends of the rotor elements 534a, 534b move toward one another. The dashed lines in FIG. 10 illustrate how the rotor elements 534a, 534b may be shaped after they are assembled into a motor or generator such as that shown in FIGS. 4, 5A, and 5B. In some embodiments, the rotor elements 534a, 534b are pre-warped prior to assembly such that the surfaces of the two magnets 102a, 102b that face one another are substantially parallel in the assembled motor or generator 400, thus making the width of the gap 1002 substantially uniform throughout. In other implementations, the rotor elements 534a, 534b may be slightly "over-warped" so that, once assembled, a taper that increases as a function of radius is obtained. While this may have the undesirable effect of reducing the gap at larger radii, it allows the use of a smaller average gap width G, thus increasing the average magnetic field strength and retaining clearance at the outer radius of the magnets 102a, 102b.

As illustrated in FIG. 10, the amount of warping the rotor element 534b experiences upon assembly may be measured by identifying a point 1004 located at the outer radius R2 of the magnet 102b, and determining a distance $D_3$ that point moves in a direction coincident with the axis of rotation 602 upon assembly. The distance $D_3$ may be measured, for example, by identifying a plane that intercepts the point 1004 and to which the axis of rotation 602 is normal and determining a distance such a plane moves relative to another plane that intercepts a point at or near the center of rotor element 534b and to which the axis of rotation 602 is also normal. In some embodiments, the distance $D_3$ is greater than 0.001 inches, or greater than 0.005 inches, or even greater than 0.01 inches. Additionally or alternatively, in some embodiments, the ratio of the distance $D_3$ to the average width G of the gap 1002 is greater than 0.01, or greater than 0.05, or even greater than 0.1. Additionally or alternatively, the ratio of the distance $D_3$ to an average clearance distance between the magnet 102b and a surface of the stator 104 (not shown in FIG. 10) may be greater than 0.25, 0.5, or even greater than 1. Accordingly, in some embodiments, the rotor element 534b may deflect as much or more than the average magnet/stator clearance distance.

Referring to FIG. 7 in conjunction with FIG. 10, it should be appreciated that, in some embodiments, the rotor elements 534a, 534b may be configured and arranged such that, for each rotor element, one or more of the following values may decrease by fifty percent or more when the rotor elements 534a, 534b are attached to the shaft 408 and caused to deflect as illustrated in FIG. 10: (1) the distance $D_1$ between the planes 706 and 708, (2) the ratio of the distance $D_1$ to the distance between the points 702 and 704, and/or to the difference between the inner radius R1 and outer radius R2 of the magnet, (3) the distance $D_2$ between planes 726 and 728, and (4) the ratio of the distance $D_2$ to the distance between the points 714 and 716, and/or to the difference between the inner radius R1 and outer radius R2 of the magnet.

Figure 11:
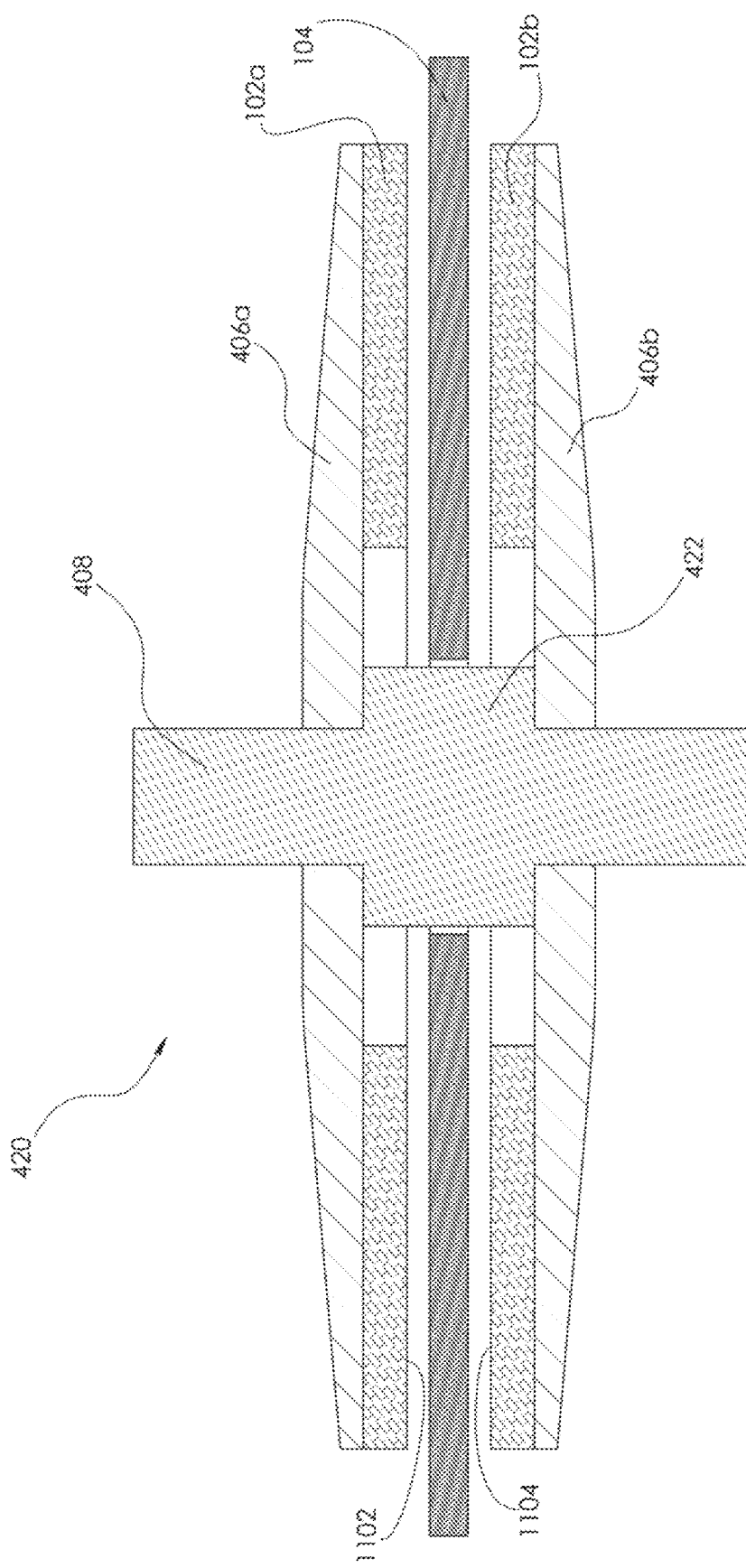
FIG. 11 shows a cutaway side view of an example of a motor or generator assembly incorporating pre-warped rotor elements such as those shown in FIG. 7, including an exaggerated gap between the respective magnets.

FIG. 11 shows a motor or generator 420, with an exaggerated gap between the magnets 102a, 102b, where the rotor elements 534a, 534b were pre-warped prior to assembly so that, upon assembly, the surfaces 1102, 1104 of the two magnets 102a, 102b that face one another are substantially parallel.

Figure 12:
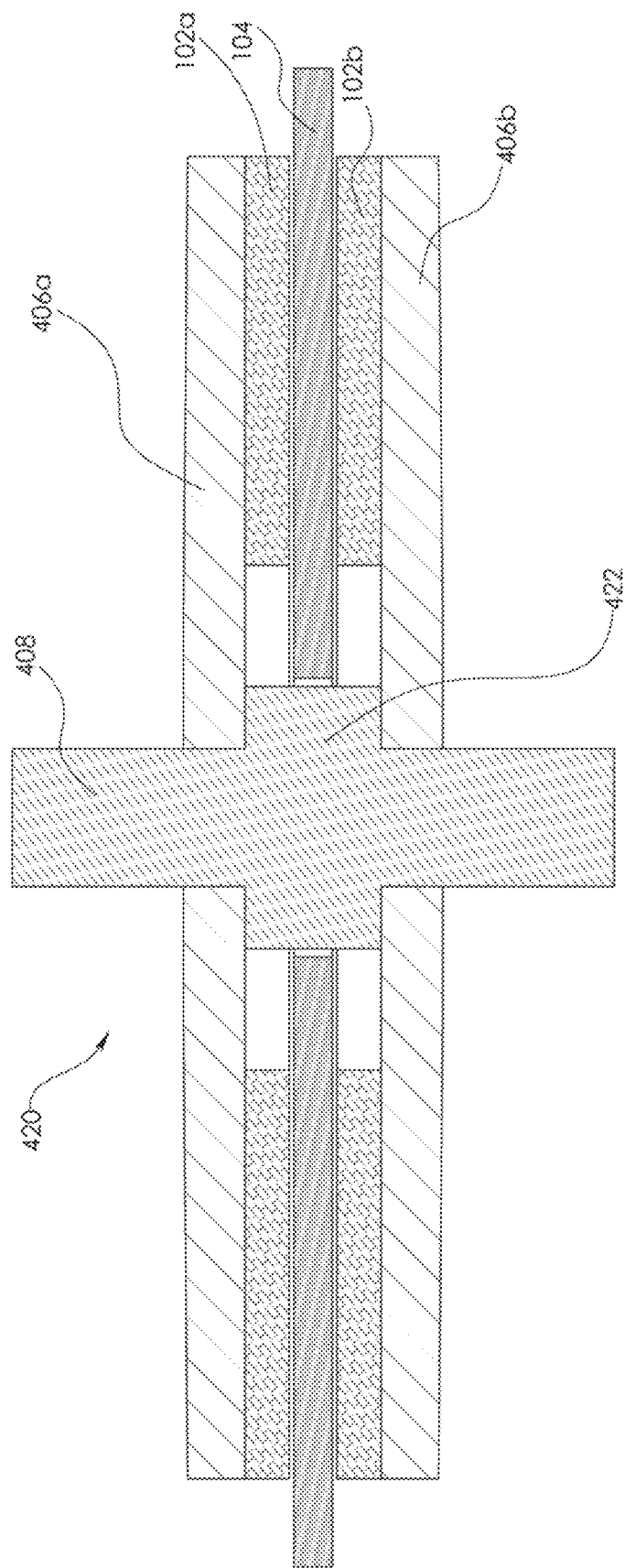
FIG. 12 shows a cutaway side view of another example of a motor or generator assembly incorporating pre-warped rotor elements as disclosed herein.

FIG. 12 illustrates a motor or generator 420 in which pre-warped rotor plates 406a, 406b each having a more uniform width throughout are employed. In such an implementation, the tapered surfaces to which the magnets 102a, 102b are attached may have each a shape similar to the example shown in FIGS. 6 and 7, but the thicknesses of the rotor plates 406a, 406b may be substantially constant in the radial direction. In other embodiments, pre-warping can be employed while varying the thicknesses of the rotor plates 406a, 406b in other ways for various reasons, such as to optimize the reluctance of the rotor plates 406a, 406b to maximize performance of the motor or generator 400.

The use of the pre-warping techniques described herein is not limited to ring magnets as described and shown above. It could also be applied, for example, to methods which utilize segmented magnets, where each rotor element comprises multiple magnets, each forming a single magnetic pole. Such designs in axial flux machines are common and suffer from the same deflection problem. A circular rotor plate with a conical taper could be used, or each magnet could be placed in its own pocket, each individually tapered such that when assembled into a motor or generator, the gap size is not reduced at the outer radius. In this case, individual flat surfaces rather than a single conic surface may, for example, be implemented.

Figure 13:
FIG. 13 is a photograph showing a top of a pre-warped rotor element configured as described herein.
Figure 14:
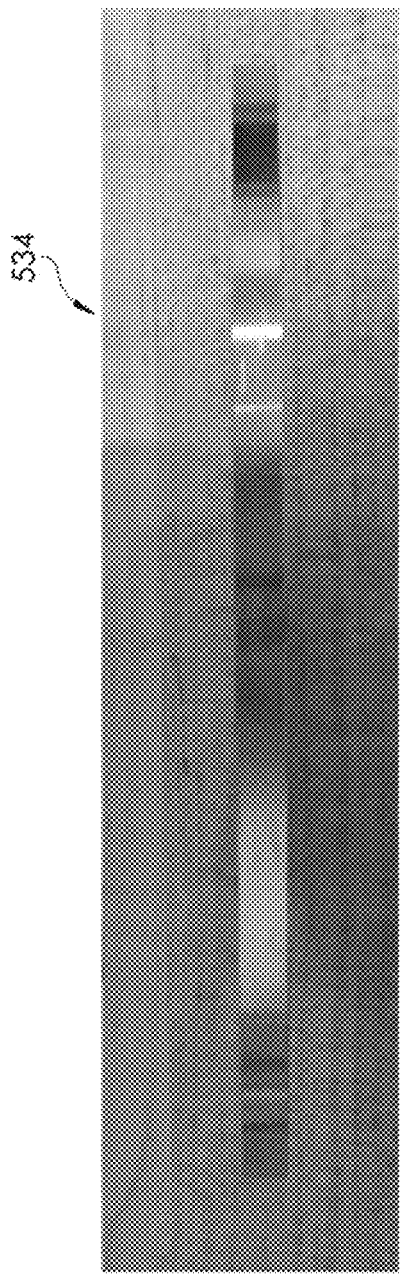
FIG. 14 is a photograph of a side of the pre-warped rotor element shown in FIG. 13.

FIGS. 13 and 14 are photographs of a rotor element 534 assembled and configured as described herein. In the example shown, the amount of taper (i.e., the value $D_1$ described in connection with FIG. 7) is very slight, with a deviation from flat of only 0.005 inches at the outer radius, which is imperceptible in the images. In this case, a computer model incorporating finite element analysis (FEA) was used to determine both the strength of the magnetic attraction and the resulting bend of the rotor element 435. The resulting deflection was calculated to be 0.002 inches. The additional 0.003 inches of taper was added to allow for some radial runout and misalignment of the bearings 116a, 116b. A jig machined for this application was used to bend the rotor into a 0.005 inch deflected state in the opposite direction it would experience in the motor or generator 400. While in this state the magnet bearing surface of the rotor plate 406 was machined flat such that when disassembled from the jig it would have the desired taper. A flat ring magnet 102 was then assembled onto the rotor plate 406. When the rotor plate 406 neared the magnet 102, the magnetic attraction caused the magnet 406 to assume the deflected shape of the rotor plate 406. Due to the magnets' much lower elastic modulus compared with steel, the rotor plate 406 did not deflect significantly and the stresses induced in the magnet were much lower than yield stress.

As in the example above, computer-based methods such as FEA can be used to accurately determine both the force acting on the rotor plate 406 due to the magnetic field and the resulting deflection profile. Typically, the simple geometry of a constant thickness rotor results in a linear deflection curve as a function of radius in the region of magnet mounting, making the desired taper a linear function of radius as seen in the examples discussed above. This taper does reduce the bending strength of the rotor plate 406 as some material is removed. While it would be possible to use an iterative method to account for the changing properties, the taper may be made slight enough that this is not necessary. The computer models enable the prediction of the amount of bending for simple and complex geometries of various materials.

The machining jig described above provides a repeatable, predictable method of machining the taper onto the rotor with the use of a machine tool that simply machines a flat face. Future tapered rotors may be created with other methods, particularly if a nonlinear taper is desired. Modern tools allow accurate designs to be developed and complex geometries to be machined which can be used as part of the optimization process of axial flux machines.

Tapered rotor elements of the type described herein have been used in running motors and demonstrated as a repeatable, effective method of controlling the size of the magnet-stator gap in axial flux machines. Measurements indicate that the taper in produced rotor elements such as those shown in FIGS. 13 and 14 are accurate and assembly has confirmed that magnets 102 align with the taper when attached to the rotor plates 406.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various aspects of the present invention may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An axial flux motor or generator, comprising:
   a rotor shaft that rotates about an axis of rotation;
   a first rotor plate engaged with the rotor shaft;
   a first magnet attached to the first rotor plate, the first magnet having a first surface that is orthogonal to a magnetization direction of the first magnet;
   a second rotor plate engaged with the rotor shaft;
   a second magnet attached to the second rotor plate such that a first magnetic flux is generated within a gap between the first and second magnets; and
   a stator disposed within the gap, the stator being configured to selectively generate a second magnetic flux that interacts with the first magnetic flux so as to cause the rotor shaft, the first rotor plate, and the first magnet to rotate in unison, wherein:
   the first rotor plate and first magnet are configured and arranged such that, if the first rotor plate and the first magnet were separated from all other magnetic field-generating components, then a distance between a first plane that intercepts a first point on the first surface and to which the axis of rotation is normal and a second plane that intercepts a second point on the first surface and to which the axis of rotation is normal would be substantially greater than zero, and
   the first and second rotor plates are positioned such that the first magnetic flux causes the distance between the first and second planes to be substantially equal to zero.

2. The axial flux motor or generator of claim 1, wherein:
   the first rotor plate has an annular shape with an opening at its center; and
   the rotor shaft is disposed within the opening.

3. The axial flux motor or generator of claim 2, wherein the first magnet comprises a ring magnet with alternating magnetic poles.

4. The axial flux motor or generator of claim 3, wherein a portion of the first rotor plate to which the first magnet is attached has a shape of a right conical frustum.

5. The axial flux motor or generator of claim 2, wherein the first magnet is one of a plurality of individual magnets that are disposed on the first rotor plate at respective angular positions about the axis of rotation.

6. The axial flux motor or generator of claim wherein:
   the first magnet has an inner edge disposed at the second point;
   the first magnet has an outer edge that is opposite the inner edge and disposed at the first point; and
   the first rotor plate and first magnet are further configured and arranged such that, if the first rotor plate and the first magnet were separated from all other magnetic field-generating components, then a ratio of the distance between the first and second planes and a distance between the first and second points would be greater than 0.002.

7. The axial flux motor or generator of claim 6, wherein:
the first rotor plate, the first magnet, the second rotor plate, and the second magnet are configured and arranged such that the ratio of the distance between the first and second planes and the distance between the first and second points is a first value; and
the first rotor plate and first magnet are further configured and arranged such that, if the first rotor plate and the first magnet were separated from all other magnetic field-generating components, then the ratio of the distance between the first and second planes and the distance between the first and second points would be a second value that is at least two times the first value.

8. The axial flux motor or generator of claim 1, further comprising:
a case at least partially enclosing the first rotor plate, the first magnet, the stator, the second rotor plate, the second magnet, and a portion of the rotor shaft, wherein:
the first rotor plate, the first magnet, the second rotor plate, the second magnet, and the rotor shaft are movable relative the case, and
the stator is fixed relative to the case.

9. The axial flux motor or generator of claim 8, further comprising:
at least one bearing disposed between the case and the rotor shaft to allow relative movement between the case and the rotor shaft.

10. The axial flux motor or generator of claim 1, wherein the first surface faces the stator.

11. The axial flux motor or generator of claim 1, wherein:
the first surface of the first magnet faces away from the first rotor plate;
the first point is at a larger radial distance from the axis of rotation than the second point; and
the first rotor plate and the first magnet are further configured and arranged such that, if the first rotor plate and the first magnet were separated from all other magnetic field-generating components, then a ray that extends away from the first surface at the first point and is normal to the first surface would intercept the second plane.

12. The axial flux motor or generator of claim 11, wherein the first rotor plate and the first magnet are further configured and arranged such that, if the first rotor plate and the first magnet were separated from all other magnetic field-generating components, then an angle between the ray and the first plane would be substantially less than 90 degrees.

13. The axial flux motor or generator of claim 11, wherein:
the first magnet has an inner edge disposed at the second point;
the first magnet has an outer edge that is opposite the inner edge and disposed at the first point; and
the first rotor plate and first magnet are further configured and arranged such that, if the first rotor plate and the first magnet were separated from all other magnetic field-generating components, then a ratio of the distance between the first and second planes and a distance between the first and second points would be greater than 0.002.

14. The axial flux motor or generator of claim 1, wherein:
the second point is at a larger radial distance from the axis of rotation than the first point;
the first and second points contact a second surface of the first rotor plate at first and second locations, respectively;
the first and second rotor plates are positioned such that the second plane is on a first side of the first plane; and
the first rotor plate and the first magnet are further configured and arranged such that, if the first rotor plate and the first magnet were separated from all other magnetic field-generating components, then:
a ray that extends away from and is normal to the second surface at the second location would intercept the first plane, and
the second plane would remain on the first side of the first plane.

15. A method for forming an axial flux motor or generator, comprising:
attaching a first magnet to a first rotor plate, the first magnet having a first surface that is orthogonal to a magnetization direction of the first magnet;
engaging the first rotor plate with a rotor shaft that is configured to rotate about an axis of rotation, wherein the first rotor plate is configured such that, after the first magnet is attached to the first rotor plate, a distance between a first plane that intercepts a first point on the first surface and to which the axis of rotation is normal and a second plane that intercepts a second point on the first surface and to which the axis of rotation is normal is substantially greater than zero; and
engaging a second rotor plate with the rotor shaft such that:
a first magnetic flux that is generated within a gap between the first magnet and a second magnet attached to the second rotor plate causes the distance between the first and second planes to be substantially equal to zero, and
a stator is disposed within the gap, wherein the stator is configured to selectively generate a second magnetic flux that interacts with the first magnetic flux so as to cause the rotor shaft, the first rotor plate, and the first magnet to rotate in unison.

16. The method of claim 15, wherein the first rotor plate has an annular shape with an opening at its center, the opening being adapted to receive the rotor shaft.

17. The method of claim 16, wherein the first magnet comprises a ring magnet with alternating magnetic poles.

18. The method of claim 17, wherein a portion of the first rotor plate to which the first magnet is attached has a shape of a right conical frustum.

19. The method of claim 15, wherein the first magnet is one of a plurality of individual magnets that are disposed on the first rotor plate at respective angular positions about the axis of rotation.

20. The method of claim 15, wherein:
the first magnet has an inner edge disposed at the second point;
the first magnet has an outer edge that is opposite the inner edge and disposed at the first point; and
after the first magnet is attached to the first rotor plate and before the second rotor plate is engaged with the rotor shaft, a ratio of the distance between the first and second planes and a distance between the first and second points is greater than 0.002.

21. The method of claim 20, wherein:
after the first magnet is attached to the first rotor plate and before the second rotor plate is engaged with the rotor shaft, the ratio of the distance between the first and second planes and the distance between the first and second points is a first value; and
after the second rotor plate is engaged with the rotor shaft, the ratio of the distance between the first and second planes and the distance between the first and second points is a second value, wherein the first value is at least two times the second value.

22. The method of claim 15, wherein the first and second rotor plates are engaged with the rotor shaft such that the first surface faces the stator.

23. The method of claim 15, wherein:
the first surface of the first magnet faces away from the first rotor plate;
the first point is at a larger radial distance from the axis of rotation than the second point; and
the first rotor plate is further configured such that, after the first magnet is attached to the first rotor plate and before the second rotor plate is engaged with the rotor shaft, a ray that extends away from the first surface at the first point and is normal to the first surface intercepts the second plane.

24. The method of claim 23, wherein:
after the first magnet is attached to the first rotor plate and before the second rotor plate is engaged with the rotor shaft, an angle between the ray and the first plane is substantially less than 90 degrees.

25. The method of claim 23, wherein, after the first magnet is attached to the first rotor plate and before the second rotor plate is engaged with the rotor shaft:
the first magnet has an inner edge disposed at the second point;
the first magnet has an outer edge that is opposite the inner edge and disposed at the first point; and
a ratio of the distance between the first and second planes and a distance between the first and second points is greater than 0.002.

26. The method of claim 15, wherein:
the second point is at a larger radial distance from the axis of rotation than the first point;
the first and second points contact a second surface of the first rotor plate at first and second locations, respectively; and
the first rotor plate is further configured such that, after the first magnet is attached to the first rotor plate and before the second rotor plate is engaged with the rotor shaft, a ray that extends away from and is normal to the second surface at the second location intercepts the first plane.

* * * * *